United States Patent
Kikuchi

(10) Patent No.: US 7,122,985 B2
(45) Date of Patent: Oct. 17, 2006

(54) SENSORLESS BRUSHLESS MOTOR

(75) Inventor: Atsushi Kikuchi, Chiba (JP)

(73) Assignee: Sony Corporation, (JP)

(*) Notice: Subject to any disclaimer, the term of this patent is extended or adjusted under 35 U.S.C. 154(b) by 0 days.

(21) Appl. No.: 10/972,968

(22) Filed: Oct. 25, 2004

(65) Prior Publication Data

US 2005/0104545 A1    May 19, 2005

(30) Foreign Application Priority Data

Nov. 5, 2003   (JP)   ............... P2003-375985

(51) Int. Cl.
  *H02P 6/10*   (2006.01)
  *H02P 6/18*   (2006.01)
(52) U.S. Cl. .............. 318/439; 318/254; 318/721; 318/722
(58) Field of Classification Search ............... None
  See application file for complete search history.

(56) References Cited

U.S. PATENT DOCUMENTS

| | | | | |
|---|---|---|---|---|
| 5,367,234 A | * | 11/1994 | DiTucci | 318/254 |
| 5,481,167 A | * | 1/1996 | Rohrbaugh et al. | 318/254 |
| 5,739,652 A | * | 4/1998 | Sriram | 318/439 |
| 5,789,895 A | * | 8/1998 | Lee | 318/811 |
| 5,929,577 A | * | 7/1999 | Neidorff et al. | 318/254 |
| 5,990,643 A | * | 11/1999 | Holling et al. | 318/254 |
| 6,064,175 A | * | 5/2000 | Lee | 318/809 |
| 6,111,372 A | * | 8/2000 | Nishimura | 318/254 |
| 6,570,353 B1 | * | 5/2003 | Krotsch et al. | 318/439 |
| 2004/0080293 A1 | * | 4/2004 | Kurosawa et al. | 318/459 |

* cited by examiner

*Primary Examiner*—Lincoln Donovan
*Assistant Examiner*—Eduardo Colon Santana
(74) *Attorney, Agent, or Firm*—Lerner, David, Littenberg, Krumholz & Mentlik, LLP

(57) ABSTRACT

A sensorless brushless motor controls a rotational speed of a rotor by sequentially energizing a plurality of excitation coils constituting a stator in accordance with a logical product between an energizing timing signal generated on the basis of a back electromotive forces and a pulse width modulation signal to control a pulse width of the pulse width modulation signal, wherein back EMF induced in the plurality of excitation coils are respectively supplied to first and second comparator circuits each having a different reference voltage, respective output signals from the first and the second comparator circuits are sampled simultaneously at a predetermined cycle, and the energizing timing signal is generated at the time of the respective output signals from the first and the second comparator circuits becoming a high-level or a low-level during the sampling. The accuracy of rotor position detection by using a back EMF is improved.

5 Claims, 7 Drawing Sheets

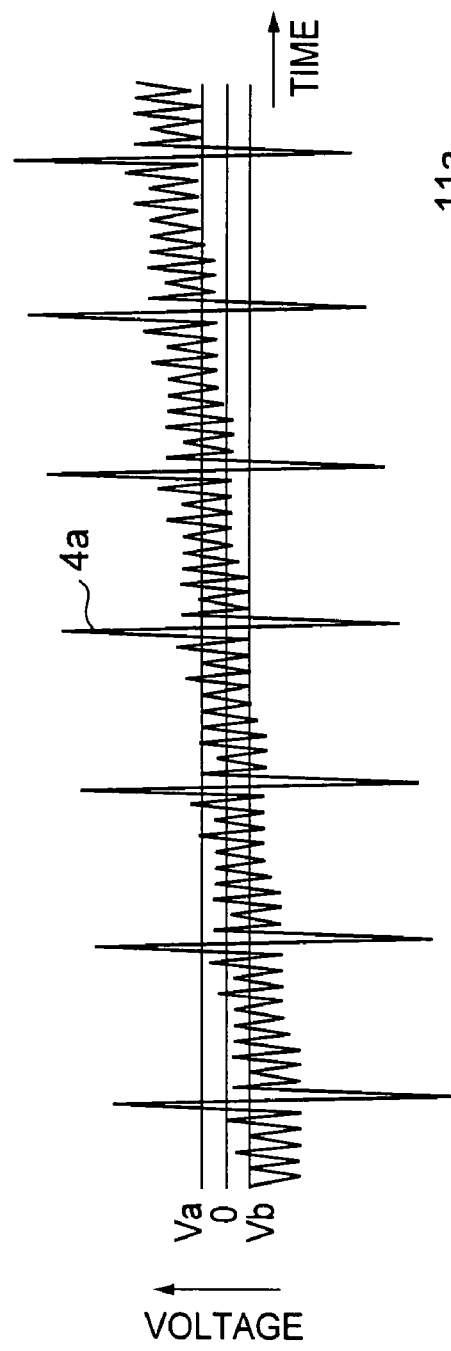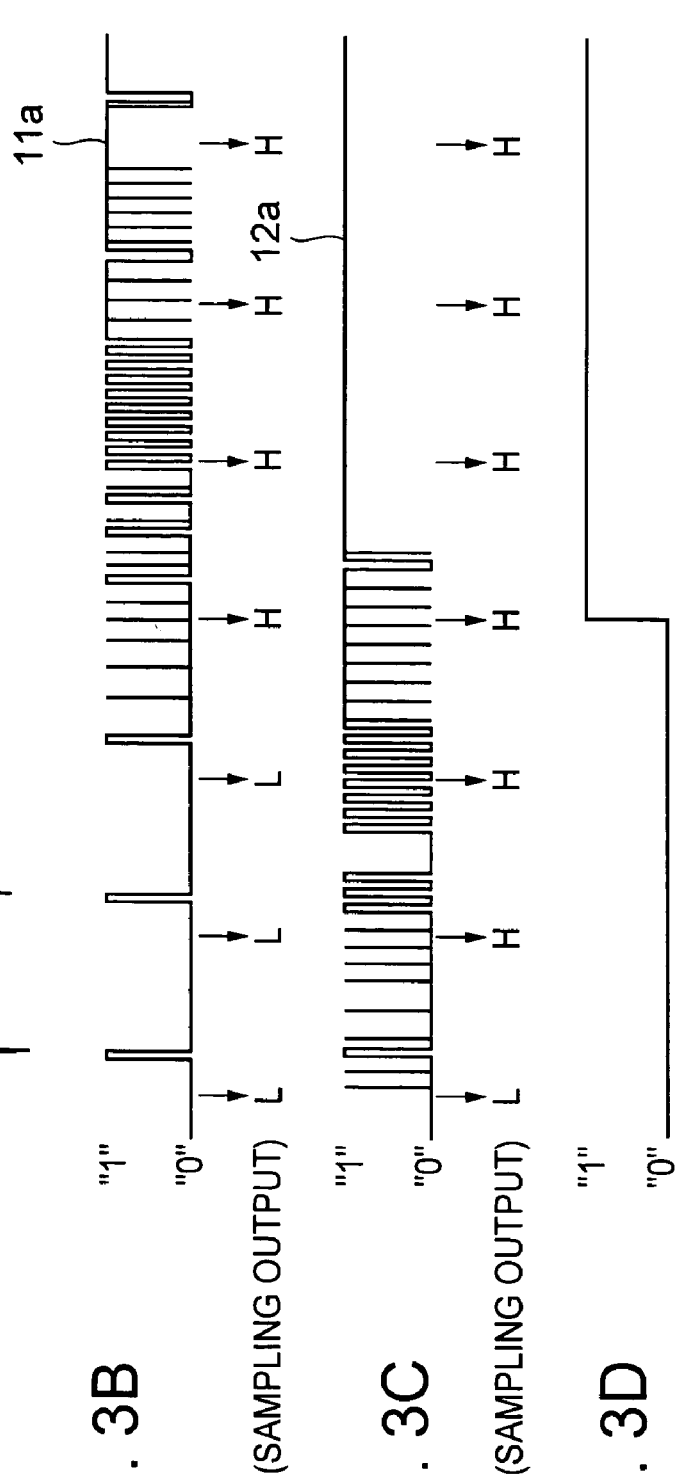

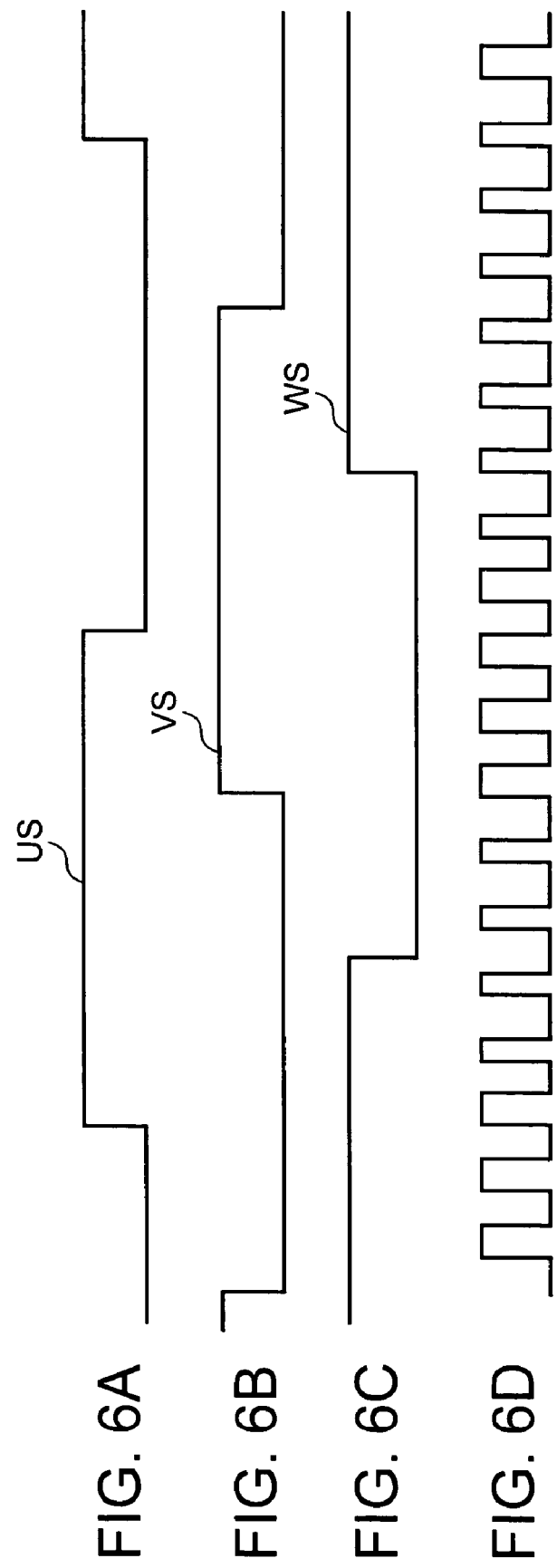

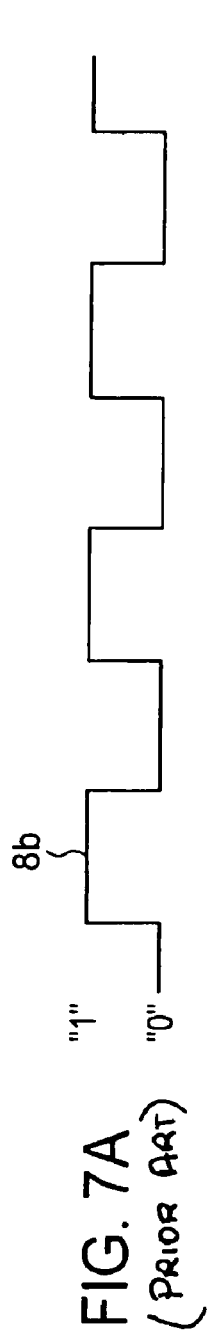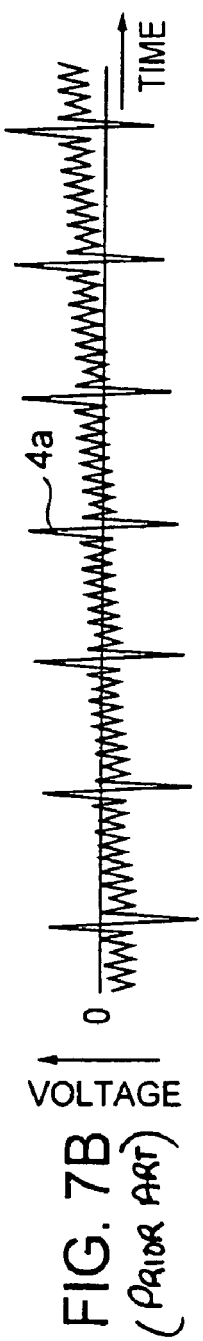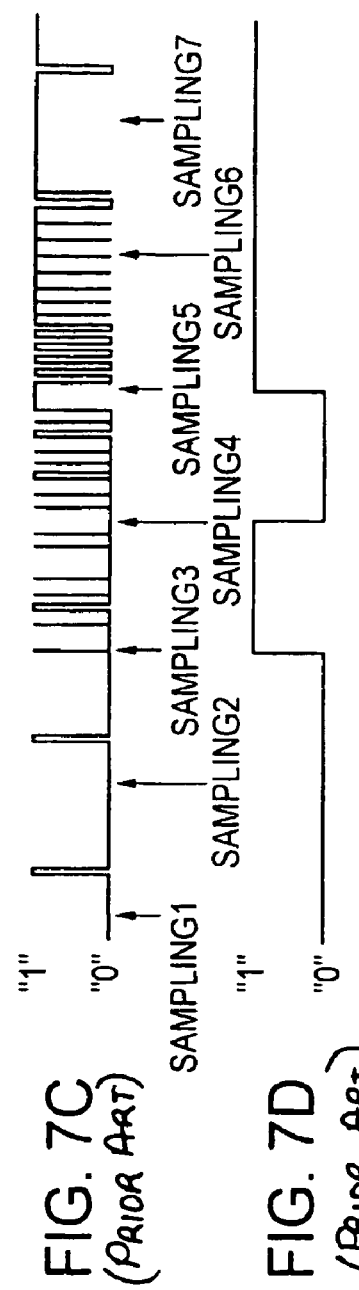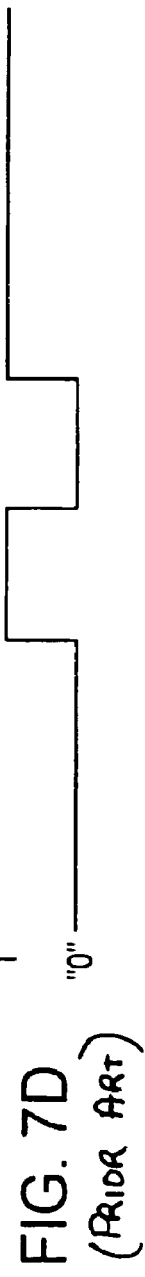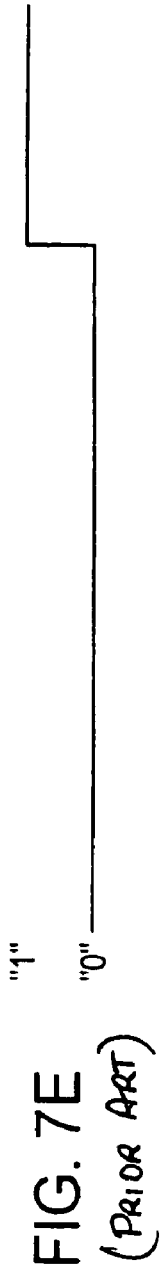

SENSORLESS BRUSHLESS MOTOR

CROSS REFERENCE TO RELATED APPLICATIONS

The present document is based on Japanese Priority Document JP2003-375985, filed in the Japanese Patent Office on Nov. 5, 2003, the entire contents of which being incorporated herein by reference.

BACKGROUND OF THE INVENTION

1. Field of the Invention

The present invention relates to a sensorless brushless motor suitable for application to various types of small motors.

2. Description of Related Art

Generally, as a small motor, there is proposed, for example, a three-phase sensorless brushless motor which has no sensor for detecting a rotational position of a rotor and no brush. In such a motor, a rotational position of the rotor is detected not by using a sensor such as a Hall element but by using a back electromotive force (back EMF) to be induced in excitation coils U, V and W constituting a three-phase stator when the rotor is rotated, then by determining a respective timing for energizing respective excitation coils U, V and W based thereon and causing to flow a current therethrough accordingly, the rotor is rotated. Therefore eliminating the need for an excitation sensitivity element such as a position detecting sensor constituted by a Hall element and the like.

As an example of such sensorless brushless motors, there has been proposed a three-phase outer rotor type sensorless brushless motor as shown in FIGS. 4, 5 and 6. A rotor 1 of this three-phase outer rotor type sensorless brushless motor is formed of a cylindrical member constituted by two North poles and two South poles, which are arranged alternately in a ring form as shown in FIG. 5. Further, a stator 2 is disposed within the cylindrical rotor 1, has three-phase excitation coils U, V and W each wound around an iron core opposing the rotor 1, and spaced apart from each other at an electrical degree of 120° as shown in FIG. 5.

These three-phase excitation coils U, V and W are connected in Y-connection as shown in FIG. 4. An excitation coil energizing circuit 3 causes an excitation current to flow, for example, from the excitation coil U to V, and from the excitation coil U to W, then sequentially switches to flow from the excitation coil V to W, V to U, W to U and W to V, repeating these sequential switching therebetween.

In this arrangement, one of the excitation coils is selected by a back EMF detection excitation coil selecting circuit 4 as an excitation coil through which no excitation current is flowed, for example, in the case that an excitation current flows from excitation coil U to V, the excitation coil W will be selected as the one. A back EMF induced in this excitation coil W, through which no excitation current flows, due to the rotation of the rotor 1 is supplied to one of input terminals of a voltage comparator circuit 5 constituted by an operating amplifier circuit, and at the same time, a neutral point voltage obtained at a neutral point in the connections of the exciting coils U, V and W is supplied to the other one of the input terminals of the voltage comparator circuit 5 as a reference voltage.

At an output terminal of the voltage comparator circuit 5, there is obtained a rectangular wave signal corresponding to a back EMF for use of detection of a rotational position of the rotor 1, which was induced in the excitation coil flowing no excitation current, and this rectangular wave signal corresponding to the back EMF for use of the position detection of the rotor 1 is supplied to an energizing timing signal generating circuit 6 and to a back EMF detection excitation coil select timing signal generating circuit 7.

The energizing timing signal generating circuit 6 receives a rectangular wave signal for detection of the position of the rotor 1, and generates energizing timing signals US, VS and WS for selecting respective excitation coils U, V and W to be energized sequentially, each having a phase difference of 120° as shown in FIGS. 6A, 6B and 6C. These energizing timing signals US, VS and WS are supplied to an excitation coil energizing circuit 3, and whereby respective two-phase excitation coils to flow an excitation current therethrough are sequentially switched over. Also, in the energizing timing signal generating circuit 6, an FG signal for detecting a rotational speed of the rotor 1 is generated. A numeric 6a depicts an output terminal of this FG signal.

Further, in response to the rectangular wave signal for detection of the position of the rotor 1 outputted from the voltage comparator circuit 5, the back EMF detection excitation coil select timing signal generating circuit 7 generates a select timing signal for selecting an excitation coil, through which no excitation current flows, for use of detecting the back EMF. The select timing signal obtained in the back EMF detection excitation coil select timing signal generating circuit 7 is supplied to the back EMF detection excitation coil selecting circuit 4, whereby an excitation coil for detecting the back EMF is selected.

Further, in FIG. 4, numeric 8 depicts a PWM (pulse-width modulation) circuit for controlling a rotational speed of the rotor 1 in the sensorless brushless motor. This PWM circuit 8 generates a pulse width modulation signal including pulse widths corresponding to an error in the rotational speed as shown in FIG. 6D. The pulse width modulation signal including the pulse widths corresponding to the error in the rotational speed generated in the PWM circuit 8 is supplied to the excitation coil energizing circuit 3. Numeric 8a depicts an error signal input terminal to which the error signal of the rotational speed of the rotor 1 is supplied.

In the excitation coil energizing circuit 3, respective excitation coils U, V and W are caused to be sequentially energized on the basis of a logical product between respective energizing timing signals US, VS, WS as shown in FIGS. 6A, 6B, 6C and a pulse width modulation signal as shown in FIG. 6D so as to ensure a predetermined rotational speed to be obtained.

In this sensorless brushless motor, a rotational position of the rotor 1 is detected not by means of a position sensor such as a Hall element but by detecting a back EMF to be induced in the excitation coils U, V and W when the rotor 1 is rotated. For that reason, if any kind of noise is superimposed on this back EMF, the accuracy in detection of the position of the rotor 1 will deteriorate.

In particular, at the time of a low speed rotation of the motor, because of this back EMF itself being very small, its detection accuracy will be further deteriorated. Although various kinds of noises may be considered as a noise to be superimposed on this back EMF, when the rotor 1 is operating by using the pulse width modulation signal as described above, an influence of a steep voltage change in the pulse width modulation signal on an excitation coil being energized becomes remarkable.

The noise generation in the excitation coil due to the steep voltage change will be described more in detail. The excitation coils being energized are intermittently applied with an external voltage via the pulse width modulation signal, as a result, the excitation coil for detecting the back EMF which is connected in common to the other excitation coils being energized is also subjected to a voltage change.

The steep voltage change occurring in the excitation coil for use of detecting the back EMF is generated such that at first a voltage change appears at its terminal on the common side, then this voltage change propagates to its another terminal on the other side, thereby an instantaneous voltage is generated at the both terminals of the excitation coil with a time difference of propagation, which becomes a noise to be superimposed on the back EMF.

Therefore, if the pulse width modulation signal given is as shown in FIG. 7A, a back EMF 4a obtained at the output terminal of the back EMF detecting excitation coil selecting circuit 4 will become as shown in FIG. 7B, in which a voltage change due to a leading edge and/or a trailing edge of the pulse width modulation signal 8b will be superimposed.

In the case of an exemplary embodiment shown in FIG. 4, a reference voltage of the voltage comparator circuit 5 is zero voltage as shown in FIG. 7B, and an output signal obtained at the output side of the voltage comparator circuit 5 is fluctuated as shown in FIG. 7C, thereby there arises a problem that the position of the rotor 1 cannot be detected accurately.

Therefore, a method as disclosed in Patent document 1 is conventionally proposed in which an output signal from the voltage comparator circuit 5 as shown in FIG. 7C is sampled at a timing which is shifted from the leading edge or the trailing edge of the pulse width modulation signal 8b by approximately one-half of a cycle of the pulse width modulation signal, and a point at which a sampled signal becomes high-level "1" or low-level "0" is specified as a position detecting point. (Patent Document 1: Japan Patent-Application Publication No. H11-4595.

SUMMARY OF THE INVENTION

However, as disclosed in the Patent Document 1, even when the output signal from the voltage comparator circuit 5 was sampled at the timing which was shifted from the leading edge point or the trailing edge point of the pulse width modulation signal 8b by approximately one-half of a cycle of the pulse width modulation signal as shown in FIG. 7C, the sampling thereof resulted in that it became a high-level "1" at a sampling position 3, then a low-level "0" at a subsequent position 4, further a high-level "1"at a next sampling position 5 as shown in FIGS. 7C and 7D. Thus, in this case, the position detection becomes unstable.

It is also proposed in the Patent Document 1 to set up a position detecting point if a plurality of high-level "1" or low-level "0" states continue, for example, twice, in the sampling described above as shown in FIG. 7E.

In this case, because the position detecting point is set up when the high-level "1" continues such as at the sampling point 5 and the sampling point 6 as shown in FIGS. 7C and 7E, if the number of noises to be superimposed increases, a possibility of delaying from its due detection position increases, thereby arising a problem to deteriorate the accuracy in the position detection of the rotor 1.

In consideration of the aforementioned drawbacks, the present invention is therefore to improve the accuracy of detection of the position of the rotor.

A sensorless brushless motor of the present invention is a sensorless brushless motor for controlling a rotational speed of a rotor by sequentially energizing a plurality of excitation coils constituting a stator in accordance with a logical product between an energizing timing signal generated on the basis of a back electromotive force and a pulse width modulation signal to control a pulse width of the pulse width modulation signal, wherein back electromotive forces induced in the plurality of excitation coils are respectively supplied to a first and a second comparator circuits each having a different reference voltage, respective output signals from the first and the second comparator circuits are sampled simultaneously at a predetermined cycle, and the energizing timing signal is generated at the time of the respective output signals from the first and the second comparator circuits becoming a high-level or a low-level during the sampling.

According to the present invention, because that the back EMF induced in the excitation coil is supplied respectively to the first and the second comparator circuits each having a different reference voltage, and respective output signals from the first and the second comparator circuits are sampled simultaneously at a predetermined cycle, and because that a position detecting point is set up when both of the output signals from the first and the second comparator circuits become high-level or low-level simultaneously during the sampling, there are such advantages that no disturbance occurs in the position detecting point, thereby improving the accuracy in the position detecting point.

BRIEF DESCRIPTION OF THE DRAWINGS

FIGS. 3A–3D are waveform diagrams for use in describing the present invention;

FIGS. 6A–6D are waveform diagrams for use in describing a sensorless brushless motor; and FIGS. 7A–7E are waveform diagrams for use in describing a conventional sensorless brushless motor.

DESCRIPTION OF THE PREFERRED EMBODIMENT

Figure 4:
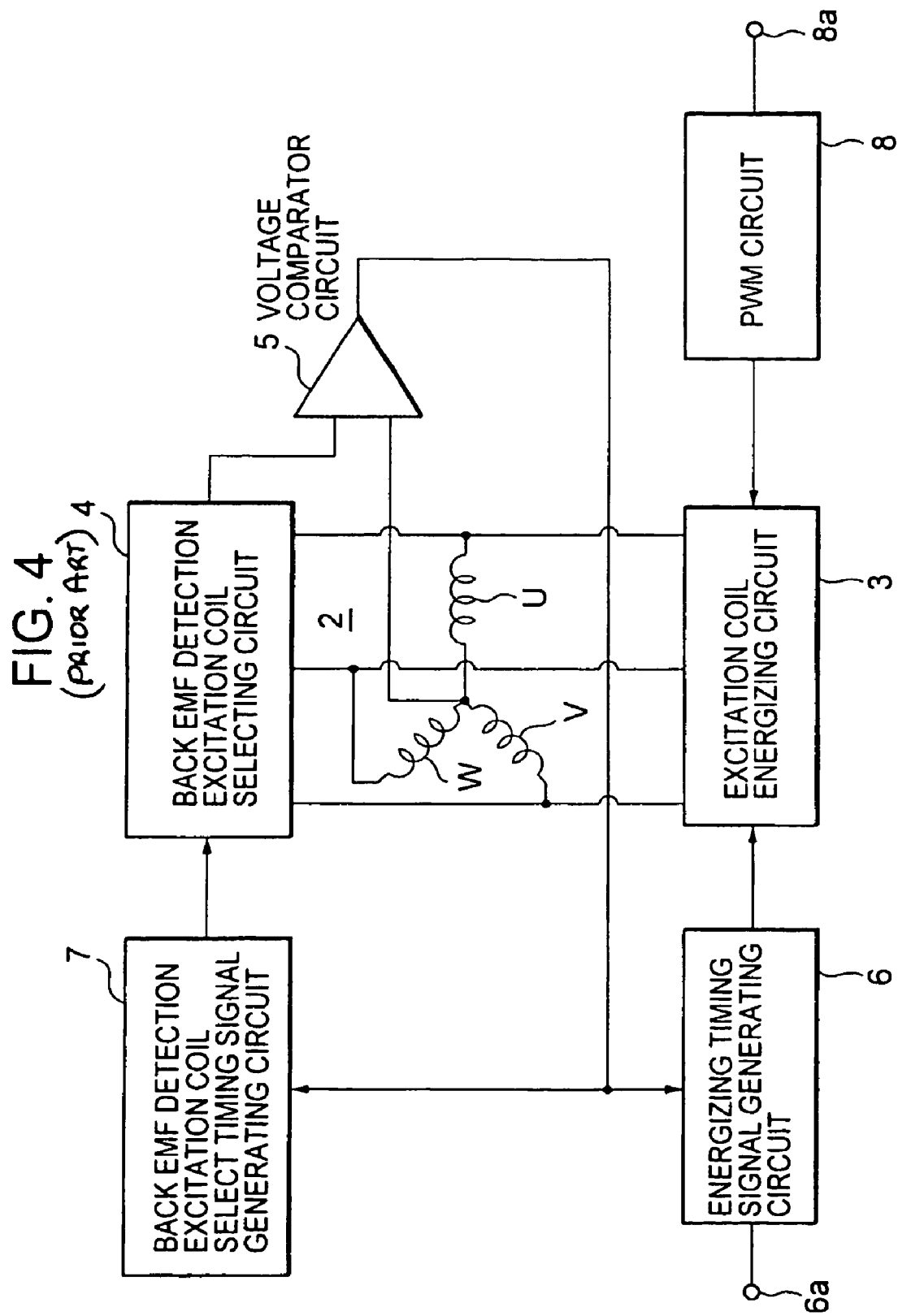
FIG. 4 is a block diagram showing a conventional sensorless brushless motor.

By referring to FIG. 1, an example of sensorless brushless motors according to the best mode for carrying out the present invention will be described in the following. The same numeric and symbols in FIG. 1 as those in FIG. 4 depict likewise parts corresponding thereto.

Figure 1:
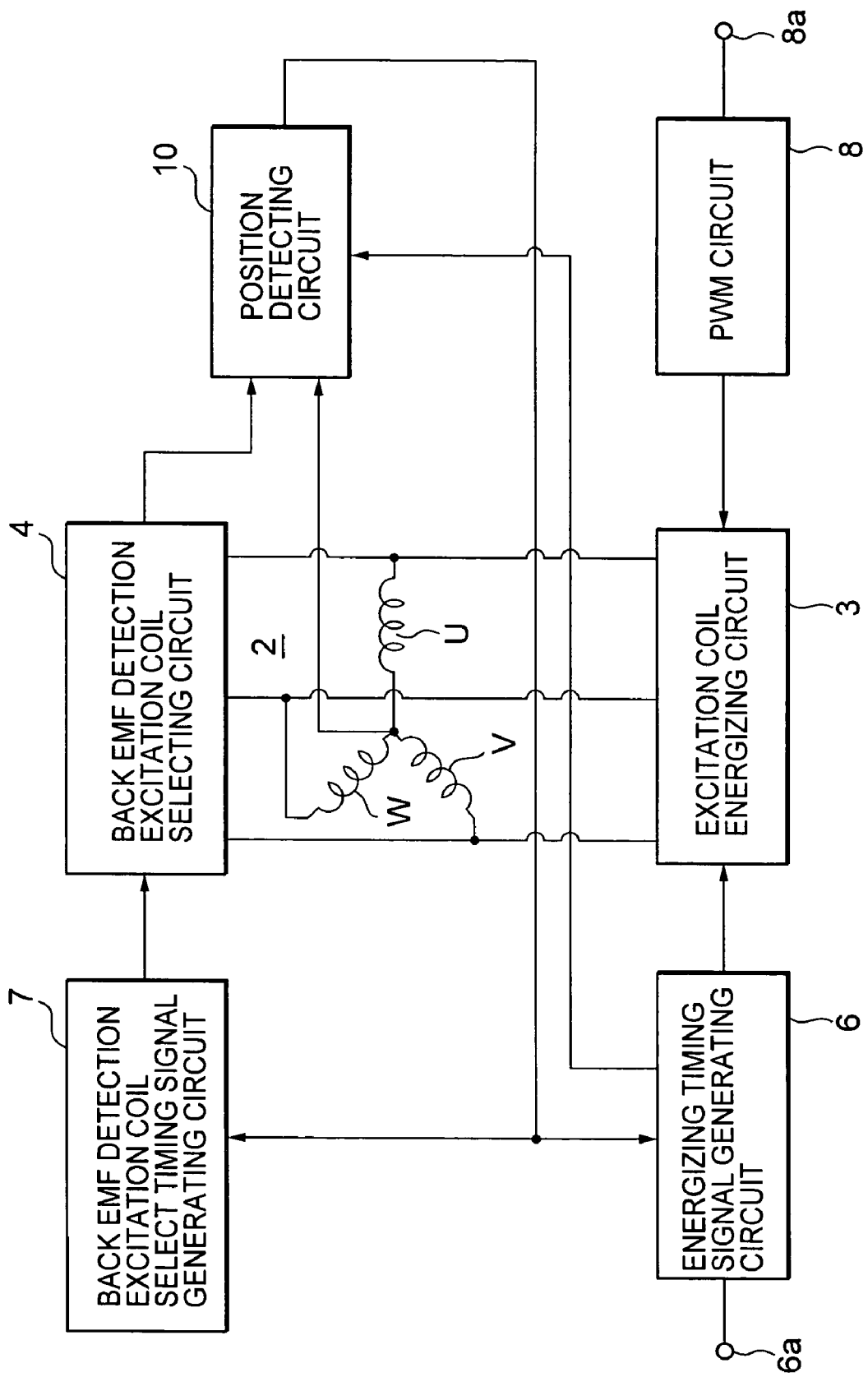
FIG. 1 is a schematic block diagram showing a sensorless brushless motor according to an exemplary embodiment of the present invention.
Figure 5:
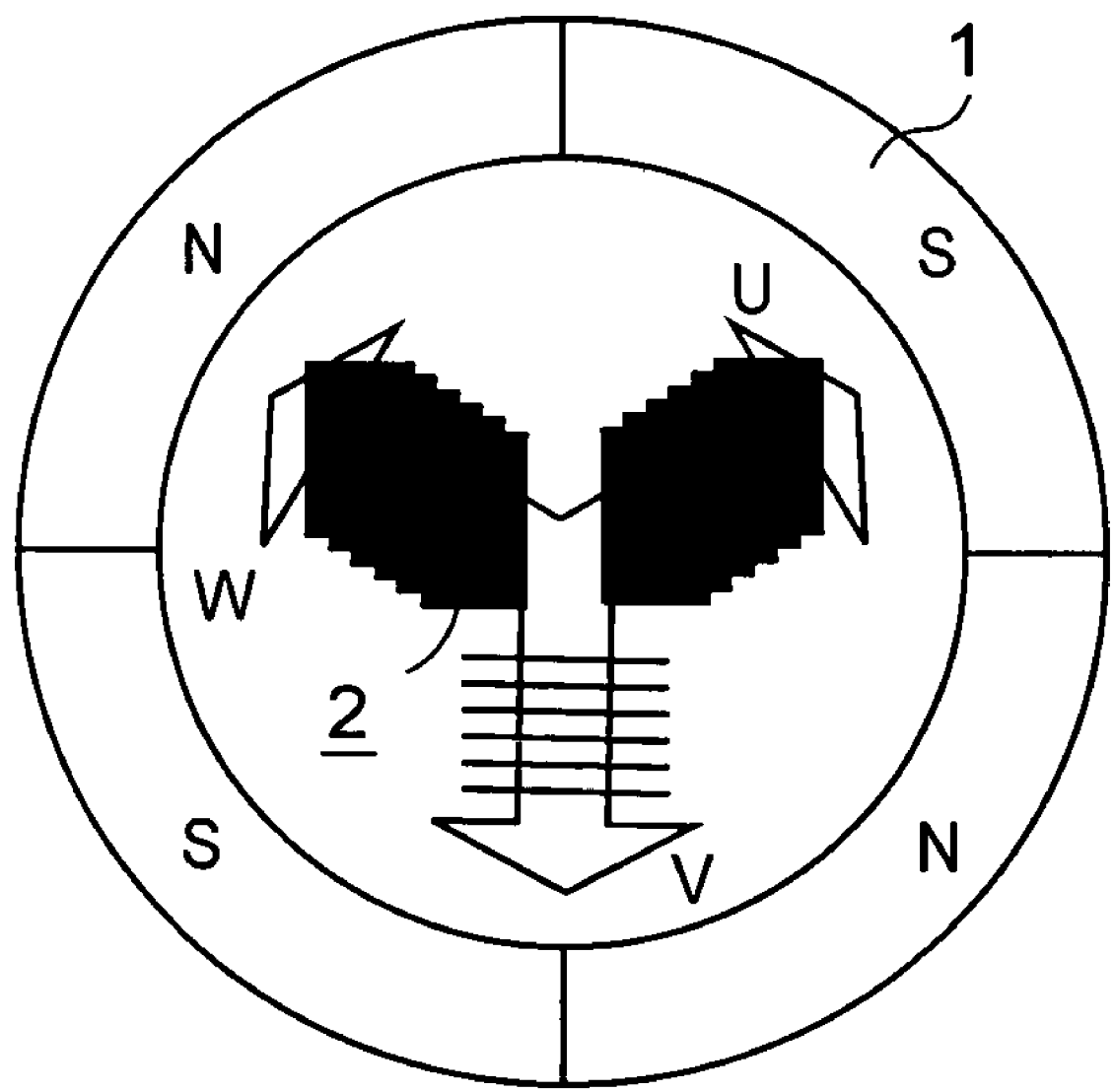
FIG. 5 is a diagram for use of describing a sensorless brushless motor.

FIG. 1 shows an example as applied to a three-phase outer rotor type sensorless brushless motor. A rotor 1 of the three-phase outer rotor type sensorless brushless motor is formed of a cylindrical member as shown in FIG. 5, for example, having two North poles and two South poles alternately arranged in a ring form. Further, a stator 2 is disposed within its cylindrical rotor 1 as shown in FIG. 5 and has, for example, three-phase excitation coils U, V and W wound around iron cores opposing the rotor 1, respective coils being arranged spaced apart at an electrical degree of 120°.

The three-phase excitation coils U, V and W of this stator 2 are connected in Y-connection as shown in FIG. 1. An excitation coil energizing circuit 3 causes an excitation current to flow, for example, from the excitation coil U to V, from excitation coil U to W, then sequentially switches to flow the current from excitation coil V to W, from V to U, from W to U, and from W to V, and repeats these switching sequences.

In this arrangement, one of the excitation coils is selected by a back EMF detection excitation coil selecting circuit 4 as an excitation coil through which no excitation current is flowed, for example, in the case that the excitation current flows from the excitation coil U to V, the excitation coil W will be selected as the one. A back EMF, which is induced due to a rotation of the rotor 1 in the excitation coil through which no excitation current is flowed for detecting a back EMF, is obtained at an output side of the back EMF detection excitation coil selecting circuit 4 and supplied to one of input terminals of a position detecting circuit 10. At the same time, a neutral point voltage of zero potential obtained at a neutral point of connections between the excitation coils U, V and W is supplied to the other one of the input terminals of the position detecting circuit 10.

Figure 2:
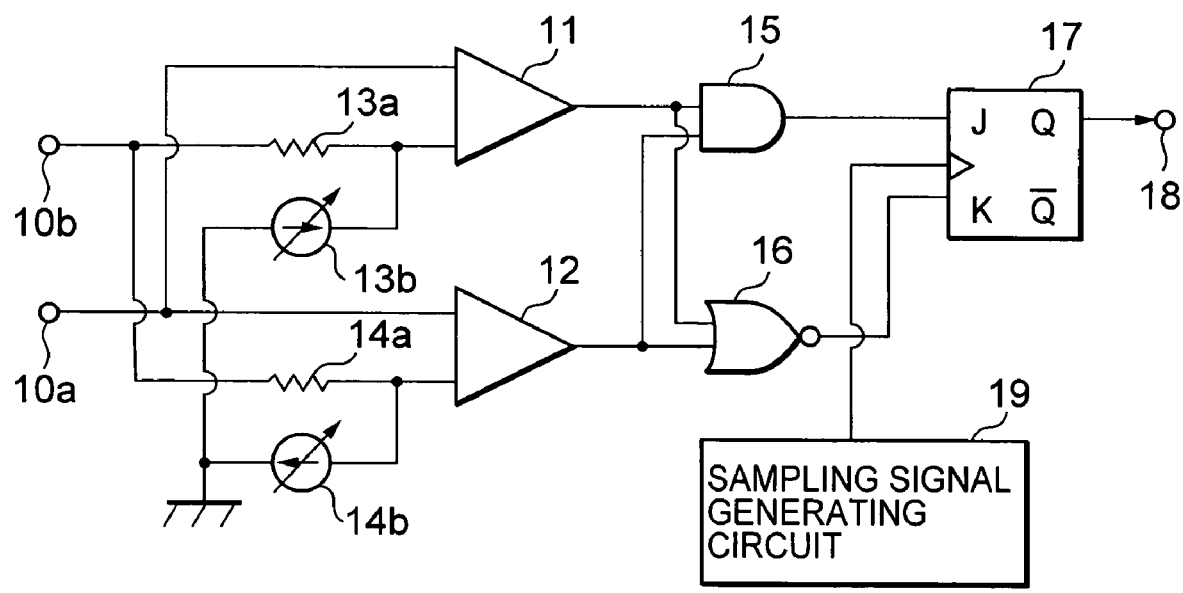
FIG. 2 is a schematic block diagram showing a position detecting circuit as a main part of the exemplary embodiment of the present invention.

In this exemplary embodiment of the invention, this position detecting circuit 10 is configured as shown in FIG. 2. In the drawing of FIG. 2, numeric 10a depicts a back EMF input terminal for being supplied a back EMF 4a from the back EMF detection excitation coil selecting circuit 4, and numeric 10b depicts a neutral point voltage input terminal for being supplied a neutral point voltage which is obtained at the neutral point of the connections of excitation coils U, V and W. By way of example, in FIG. 2, a voltage which is superimposed with a switching noise or the like due to a pulse width modulation signal 8b as shown in FIG. 3A is applied across the input terminals 10a and 10b.

The back EMF 4a obtained at the back EMF input terminal 10a is supplied respectively to one of input terminals of comparator circuits 11 and 12, which are constituted by operational amplifier circuits. Further, the neutral point voltage obtained at the neutral point voltage input terminal 10b is supplied respectively to the other one of the input terminals of the comparator circuits 11 and 12 via respective resistors 13a and 14a.

Further, the other one of the input terminals of the comparator circuit 11 is grounded via a variable constant current circuit 13b. In this case, by means of the resistor 13a and the variable constant current circuit 13b, a reference voltage Va is obtained, which is off-set in a positive direction as shown in FIG. 3A, and this reference voltage Va is supplied to the other one of the input terminals of the comparator circuit 11.

Still further, the other one of the input terminals of the comparator circuit 12 is grounded via a variable constant current circuit 14b. In this case, by means of the resistor 14a and the variable constant current circuit 14b, a reference voltage Vb is obtained, which is off-set in a negative direction as shown in FIG. 3A, and this reference voltage Vb is supplied to the other one of the input terminals of the comparator circuit 12.

On an output side of the comparator circuit 11, as shown in FIG. 3B, a signal 11a is obtained, in which a voltage over the reference voltage Va which is off-set in the positive direction of the back EMF 4a is defined as high-level "1", and a voltage below the reference voltage Va is defined as low-level "0". On an output side of the comparator circuit 12, as shown in FIG. 3C, a signal 12a is obtained, in which a voltage over a reference voltage Vb which is off-set in the negative direction of the back EMF 4a is defined as high-level "1", and a voltage below the reference voltage Vb is defied as low-level "0".

Output signals 11a and 12a from the comparator circuits 11 and 12 are supplied to respective input terminals of an AND circuit 15, and at the same time, the output signals 11a and 12a from the comparator circuits 11 and 12 are supplied to respective input terminals of a NOR circuit 16.

An output signal from the AND circuit 15 is supplied to a J terminal of a JK flip-flop circuit 17, and also an output signal from the NOR circuit 16 is supplied to a K terminal of the JK flip-flop circuit 17. An output terminal 18 is led out from a Q terminal of the JK flip-flop circuit 17.

Further, numeric 19 designates a sampling signal generating circuit provided in the energizing timing signal generating circuit 6. A sampling signal generated in the sampling signal generating circuit 19 has such a sampling timing as indicated by arrows in FIGS. 3B and 3C, the cycle of which is shifted by approximately one-half of the cycle of the pulse width modulation signal relative to the leading edge or the trailing edge thereof.

A sampling signal generated in the sampling signal generating circuit 19 is supplied to a clock terminal of the JK flip-flop circuit 17. An output signal obtained at the Q terminal, i.e., the output terminal 18 in the JK flip-flop circuit 17 is supplied to the energizing timing signal generating circuit 6.

In the position detecting circuit 10 shown in FIG. 2, respective output signals as shown in FIGS. 3B and 3C from the comparator circuits 11 and 12 are supplied to the input terminal of the AND circuit 15 and to the input terminal of the NOR circuit 16, respectively, then an output signal from the AND circuit 15 is supplied to J terminal of the JK flip-flop circuit 17 while an output signal from the NOR circuit 16 is supplied to K terminal of the JK flip-flop circuit 17.

In the JK flip-flop circuit 17, when a sampling signal is supplied to the clock terminal as shown in FIGS. 3B, 3C and 3D, if the J terminal is high-level "1" and the K terminal is low-level "0", i.e., if both of the respective output signals from the comparator circuits 11 and 12 are high-level "1", the Q terminal becomes high-level "1", alternatively, if the J terminal is low-level "0" and the K terminal is high-level "1", i.e., if both of the respective output signals from the comparator circuits 11 and 12 are low-levels "0", the Q terminal becomes low-level "0", or if both of the J terminal and the K terminal are low-levels "0", i.e., if the respective output signals from the comparator circuits 11 and 12 are different, the Q terminal retains a preceding state.

Therefore, unless both of the output signals from the comparator circuits 11 and 12 are identical, the Q terminal in the JK flip-flop circuit 17 does not change. This is substantially equivalent to a fact that respective output signals at the sampling moment are combined together and hysteresis is applied thereto. As a result, an adverse effect of fluctuations due to the leading edge and the trailing edge in the pulse width modulation signal on the stability of the back EMF can be minimized as shown in FIG. 3D.

Advantageously, therefore, the position detecting signal is stabilized as shown in FIG. 3D, and in addition, enabling for a high precision position detection to be carried out.

By way of example, an off-set quantity of the reference voltages Va and Vb for the comparator circuits 11 and 12 is appropriately specified in consideration of a back EMF in a sensorless brushless motor to be used and a magnitude of a noise to be superimposed in excitation coils U, V and W thereof. Because that the back EMF and the noise will change depending on the conditions of use, it is preferable for a quantity of off-set to be arbitrary variable. By allowing a variable setting of the reference voltages Va and Vb, an optimum setting can be implemented.

Further, in the exemplary embodiment shown in FIG. 1, a rotor position detecting signal as shown in FIG. 3D which is obtained at the output side of the position detecting circuit 10 is supplied to the energizing timing signal generating circuit 6 and to the back EMF detection excitation coil select timing signal generating circuit 7.

In response to a position detecting signal of the rotor 1, the energizing timing signal generating circuit 6 generates energizing timing signals US, VS and WS, each phase thereof being shifted sequentially by 120° as shown in FIGS. 6A, 6B and 6C, for selecting excitation coils U, V and W to be energized. The energizing timing signals US, VS and WS obtained in the energizing timing signal generating circuit 6 are supplied to the excitation coil energizing circuit 3, whereby respective two-phase excitation coils are sequentially switched to allow for an excitation current to flow therethrough.

Generally, in the sensorless brushless motor, a zero cross point of the back EMF is detected in order to generate an FG signal for detecting a rotational speed. Thereby, also in this embodiment, this FG signal is generated in the energizing timing signal generating circuit 6. By improving the accuracy of the position detection based on the back EMF, also the precision of the FG signal can be improved. Numeric 6a depicts an output terminal of the FG signal.

Further, in response to the position detecting signal of the rotor 1 obtained at the output side of the position detecting circuit 10, the back EMF detection excitation coil select timing signal generating circuit 7 generates a select timing signal for selecting an excitation coil through which no excitation current is flowed to be used for detecting the back EMF. The select timing signal obtained in the back EMF detection excitation coil select timing signal generating circuit 7 is supplied to the back EMF detecting excitation coil selecting circuit 4 to select an appropriate excitation coil for use of detecting the back EMF.

Still further, in FIG. 1, numeric 8 depicts a pulse width modulation (PWM) circuit for controlling a rotational speed of the rotor 1 of the sensorless brushless motor. The PWM circuit 8 generates a pulse width modulation signal having pulse widths corresponding to errors in a rotational speed as shown in FIG. 6D, and this pulse width modulation signal having the pulse widths corresponding to the errors in the rotational speed generated in the pulse width modulation circuit 8 is supplied to the excitation coil energizing circuit 3. Numeric 8a depicts an error signal input terminal via which an error signal in the rotational speed of the rotor 1 is supplied.

The excitation coil energizing circuit 3 allows for the excitation coils U, V and W to be sequentially energized on the basis of a logical product between energizing timing signals US, VS, WS as shown in FIGS. 6A, 6B, 6C and a pulse width modulation signal as shown in FIG. 6D so as to achieve a predetermined rotational speed.

According to the embodiment of the present invention, because it is arranged such that the back EMF induced in the excitation coils U, V, W is supplied respectively to the comparator circuits 11 and 12 each having the different reference voltages Va and Vb, that respective output signals from the respective comparator circuits 11 and 12 are simultaneously sampled at the timing which is shifted by approximately one-half of the cycle of the pulse width modulation signal 8b relative to the leading edge or the trailing edge in the pulse width modulation signal, and that the position detecting point is set up if both of the respective output signals from the respective comparator circuits 11 and 12 become high-level "1" or low-level "0" simultaneously during the sampling. This is considered to be equivalent to a fact that the respective output signals at the moment of a respective sampling are combined together and hysteresis is applied thereto, thereby eliminating the fluctuation in the position detecting point and improving the accuracy in the position detecting point.

According to the embodiment of the present invention, because the accuracy of position detection is improved by utilization of the back EMF, the precision of rotation in the sensorless brushless motor embodying the invention can be further improved.

Furthermore, when the FG signal is generated on the basis of the zero cross point in the back EMF, because the precision in the position detection is enhanced by use of the back EMF, the precision in the FG signal will also improve.

Still further, according to the embodiment of the invention, because that an erroneous position detection of the rotor 1 due to the noise to be superimposed on the back EMF induced in the excitation coils U, V, W is minimized, the starting characteristics of the sensorless brushless motor can advantageously be improved, and at the same time, an operation at a low speed of the sensorless brushless motor, which has been not conventionally satisfied, to be operable.

Further, because a risk of mistaking a noise occurring at the time of stopping of the sensorless brushless motor as a back EMF is eliminated, the stoppage thereof can be detected surely, and also an erroneous generation of the FG signal can be eliminated.

Although in the above-mentioned embodiment of the invention, it is described that by the provisions of the back EMF detection excitation coil select timing signal generating circuit 7 and the back EMF detection excitation coil selecting circuit 4, the excitation coil for use of detecting the back EMF is selected. However, it is not limited thereto, and, instead thereof, it may be arranged such that a position detecting circuit 10 as shown in FIG. 2 is provided for the excitation coils U, V and W, respectively.

Still further, although the present invention has been described by way of example as applied to the three-phase sensorless brushless motor, it is not limited thereto, and it should be noted that the present invention is applicable to any other sensorless brushless motors having any phases other than the above.

It is therefore to be understood that any modifications will be practiced otherwise than as specifically described herein without departing from the scope of the present invention.

What is claimed is:

1. A sensorless brushless motor in which a rotational speed of a rotor is controlled by sequentially energizing a plurality of excitation coils constituting a stator in accordance with a logical product between an energizing timing signal generated based on a back electromotive force and a pulse width modulation signal, in which a pulse width of said pulse width modulation signal is controlled, wherein back electromotive forces induced in said plurality of excitation coils are supplied to both a first comparator circuit and a second comparator circuit, each having a different reference voltage, respective output signals from said first and said second comparator circuits are sampled simultaneously at a predetermined cycle, and said energizing timing signal is generated at a time said respective output signals from said first and said second comparator circuits both become a high-level or both become a low-level during said sampling.

2. The sensorless brushless motor according to claim 1, wherein the reference voltages of said first and second comparator circuits are variable.

3. The sensorless brushless motor according to claim 2, wherein a sampling cycle of respective output signals from said first and second corrparator circuits is shifted from a leading edge or a trailing edge of a pulse width modulation signal by approximately one-half of a cycle of said pulse width modulation signal.

4. The sensorless brushless motor according to claim 1, wherein a sampling cycle of respective output signals from said first and second comparator circuits is shifted from a leading edge or a trailing edge of said pulse width modulation signal by approximately one-half of a cycle of said pulse width modulation signal.

5. A sensorless brushless motor for controlling a rotational speed of a rotor by sequentially energizing a plurality of excitation coils constituting a stator in accordance with a logical product between an energizing timing signal generated based on a back electromotive force and a pulse width modulation signal, wherein back electromotive forces induces ion said plurality of excitation coils are respectively supplied to first and a second comparator circuits, each having a different reference voltage; respective output signals from said first and second comparator circuits are respectively supplied to both input terminals of an AND circuit and a NOR circuit; and an output signal from said AND circuit is supplied to a J terminal of a JK flip-flop circuit and an output signal from said NOR circuit is supplied to a K terminal of said JK flip-flop circuit;

a sampling signal of a predetermined cycle is supplied to a clock terminal of said JK flip-flop circuit; and said energizing timing signal is generated based on signal obtained at a Q terminal of said JK flip-flop circuit.

* * * * *

UNITED STATES PATENT AND TRADEMARK OFFICE
CERTIFICATE OF CORRECTION

| | |
|---|---|
| PATENT NO. | : 7,122,985 B2 |
| APPLICATION NO. | : 10/972968 |
| DATED | : October 17, 2006 |
| INVENTOR(S) | : Atsushi Kikuchi |

It is certified that error appears in the above-identified patent and that said Letters Patent is hereby corrected as shown below:

In Column 10, Line 4, "induces ion" should read -- induced in--.

Signed and Sealed this

Seventh Day of August, 2007

JON W. DUDAS
*Director of the United States Patent and Trademark Office*